Dec. 8, 1970     A. B. HUBBARD ET AL     3,545,890
REGENERATIVE COMPRESSOR

INVENTORS
ALBERT B. HUBBARD,
JOHN C. LARSON,
BY BOHUMIR A. LARYS &
LEWIS F. SMITH

*Brumbaugh, Free, Graves & Donohue* their ATTORNEYS

INVENTORS
ALBERT B. HUBBARD,
JOHN C. LARSON,
BY BOHUMIR A. LARYS &
LEWIS F. SMITH their ATTORNEYS Dec. 8, 1970  A. B. HUBBARD ET AL  3,545,890
REGENERATIVE COMPRESSOR Filed Dec. 29, 1967  3 Sheets-Sheet 3

INVENTORS
ALBERT B. HUBBARD,
JOHN C. LARSON,
BY  BOHUMIR A. LARYS &
LEWIS F. SMITH their  ATTORNEYS United States Patent Office 3,545,890
Patented Dec. 8, 1970

3,545,890
REGENERATIVE COMPRESSOR
Albert B. Hubbard, John C. Larson, and Bohumir A. Larys, Woodstock, and Lewis F. Smith, Schenectady, N.Y., assignors to Mechanical Technology, Incorporated, Latham, N.Y., a corporation of New York, and Rotron Manufacturing Company, Inc., Woodstock, N.Y., a corporation of New York
Filed Dec. 29, 1967, Ser. No. 694,602
Int. Cl. F04d 17/08, 25/06, 29/40
U.S. Cl. 417—368                                   42 Claims

ABSTRACT OF THE DISCLOSURE

A regenerative compressor including a stationary housing having an annular compressor chamber comprised of adjacent cavity and blade pass portions and an impeller supported for rotation in the housing about the axis of the compressor chamber and including a succession of spaced radially projecting blades occupying the blade pass chamber portion. The blades are shaped to conform to the cross-sectional geometry of the blade pass portion of the chamber and are unshrouded so that adjacent blades and the wall of the blade pass chamber portion define a series of peripheral cavities which induce vortex motion of the fluid in the chamber about the line of fluid transport between inlet and outlet ports. One of the inlet and outlet ports communicates with the cavity portion of the compressor chamber, and the other of the ports communicates with the blade pass portion permitting porting of the fluid from one side of the housing to the other. A flow stripper interrupts the cavity portion of the chamber to preserve a pressure gradient in the transport direction that results in flow of the compressed fluid through the outlet port, which is located to set up a counter-vortex to straighten the exit flow.

DISCLOSURE

This invention relates to regenerative compressors of the type including an annular compressor chamber and an impeller having spaced blades. In particular, the invention relates to improved compressors of this type, in which only a portion of the compressor chamber is occupied by the impeller blades which are unshrouded and shaped to induce vortex motion of the fluid about the line of fluid transport in the compressor chamber.

Relative inexpensiveness of manufacture and maintenance, simplicity, and compactness are among the advantages of such regenerative compressors. In one type of known regenerative compressor the impeller blades occupy essentially the total cross-section of an annular compressor section of rectangular cross-section. The blades are mounted on a rotor disc which both supports the blades and divides the annular compressor chamber into two identical half chambers. In that compressor, the inlet and outlet ports are each located in a respective peripheral wall of the compressor chamber. For example, fluid may be introduced into the compressor chamber through an inlet port in the outer wall of the compressor chamber, which is of the greatest circumference, and withdrawn from an outlet port located in the inner wall, of lesser circumference. Because of the construction of the impeller and compressor chambers, the fluid must undergo several changes in direction and consequent pressure loss in being routed from the inlet to the outlet ports or from one compressor stage to another (each stage comprising essentially a separate independent compressor in which the impeller is driven from a common shaft).

In another, improved compressor of this type, an annular, or toroidal, chamber is defined by two independent housing halves. One of the housing halves is stationary and includes the cavity portion of the compressor chamber. The other half contains a similar annular cavity in which impeller blades are integrally mounted. Thus, one half of the housing rotates with respect to the first, stationary housing half. That improved compressor provides reasonably good efficiency and simplicity of construction, and has been found to satisfy the requirements which it is designed to meet. While limited multistage arrangements of that compressor are economically accomplished, its construction necessitates location of the inlet and outlet ports in the stationary housing section. This makes the routing of fluid between compressor stages less efficient than for other port locations because of the required direction changes in the fluid flow. In compressors of this construction, a small amount of leakage of the fluid occurs from the compressor chamber through the gap between the stationary and rotating halves of the housing. In many applications, this leakage is not of serious proportion to the total flow delivery, but nevertheless limits the obtainable efficiency.

In general, both of the foregoing arrangements restrict the selection of intake and outlet port location and design, leading to diminished overall compressor efficiency. Additionally, the inertias of the impellers tend to be excessive, prohibiting driving of the compressors with motors having low starting torques.

The present invention, in its simplest form, comprises a stationary housing defining an annular compressor chamber comprised of adjacent annular blade pass and cavity portions. An impeller, including a rotor and a series of unshrouded mutually spaced blades projecting radially from the periphery of the rotor, is supported in the housing for rotation about the axis of the compressor chamber. The blades of the impeller occupy only the blade pass portion of the chamber and are shaped to conform to the cross-sectional geometry of that portion and to induce vortex motion of the fluid in the chamber about the line of fluid transport upon rotation of the impeller. A flow stripper, or flow cut-off, is disposed in the cavity portion of the impeller to interrupt the flow and establish a pressure gradient in the transport direction, i.e., the direction of impeller rotation, resulting in flow of the compressed fluid through an outlet port, which is preferably located to induce a counterspin motion in the stream to reduce turbulence and straighten the flow in the outlet passage. The spaces defined between adjacent impeller blades and the wall of the blade pass portion of the compressor chamber form a series of cavities at the periphery of the impeller rotor, thus permitting the location of the inlet and outlet ports in either or both of the chamber portions. This arrangement allows for the introduction and extraction of flow from the compressor with the least flow impedance and with minimal changes in flow direction.

In preferred embodiments of the invention, the inlet and outlet ports include passages that are convolute about an axis generally tangential to the direction of fluid transport at the port. The convolute inlet passage imparts a vortex motion to the fluid entering the compressor chamber and thus reduces the tendency of the flow to become turbulent in the compressor chamber near the inlet. Similarly, the convolute outlet passage allows the fluid to continue in the direction in which it was traveling prior to reaching the outlet, thus reducing the impedance imposed on the flow by the presence of the fluid stripper. In addition to being convolute, the inlet and outlet passages may also be constructed to give the fluid introduced and extracted a velocity component generally tangent to the direction of fluid transport.

While it is advantageous to continue the general directions of the helical motion of the various fluid streamlines into and through the convolute outlet port, an additional provision is made to counteract the spin of such continued and enlarged vortex as it approaches the external duct which may be connected to the outlet. Velocities in the vortex vary with radius as a result of blade shape and, further, as each streamline of fluid attempts to preserve its angular momentum. The unequal velocities that occur in a vortex are not desirable in a connecting duct. If those velocities are not made substantially equal, the fluid tends to expend its angular momentum in a tumbling motion commonly referred to as a turbulence. In this invention the fluid velocity profile in or near the outlet port is straightened by requiring the stream to make a partial turn of rotation opposite to that of the vortex. Angular momentum conservation in the imposed opposite turn acts to cause an oppositely sloped velocity profile which averages with the unwanted profile to even the flow. This avoids inefficient delivery of fluid to the external duct.

In still further embodiments of the invention, the housing and impeller are constructed to reduce the leakage flow through the running clearance gap between the impeller and adjacent sides of the housing, as well as between the impeller blades and the chamber, to further increase the compressor efficiency.

For a better and more complete understanding of the invention, together with the advantages, objects and further aspects thereof, reference may be made to the following detailed description and to the drawings, in which.

COMPRESSOR HOUSING AND IMPELLER

Figures 1, 2, 3, 4:
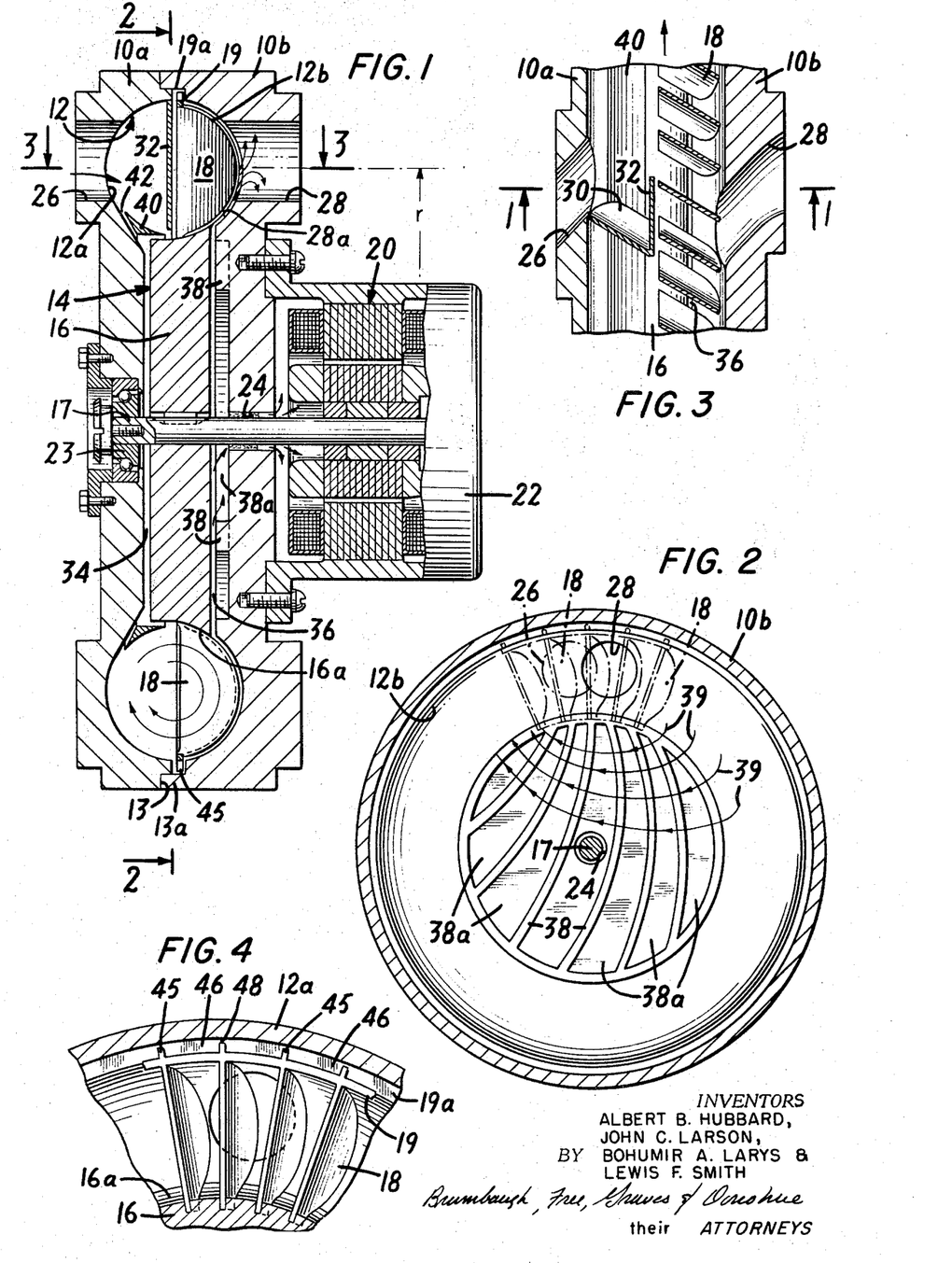
FIG. 1 is an elevational view in cross-section of a compressor in accordance with the invention.
FIG. 2 is a cross-sectional view of the compressor, taken generally along the line 2—2 in FIG. 1.
FIG. 3 is a partial cross-sectional view of the compressor taken along the line 3—3 in FIG. 1.
FIG. 4 is a partial elevational view in cross-section as seen generally along the line 2—2 in FIG. 1, showing the construction of the compressor impeller assembly.

Referring to FIGS. 1–3, the basic elements of a compressor according to the invention include a compressor housing comprising the sections 10a and 10b which define an annular compressor chamber 12 of circular cross-section. It will be understood, of course, that the cross-section of the chamber need not be circular but may take other shapes, such as oval and elliptical. Housing section 10a is circumferentially grooved at 13 to accept a complementary annular projection 13a on section 10b so that the sections may be relatively rotated.

Supported in the housing for rotation about the axis of the compressor chamber is an impeller 14 comprised of a disc-shaped rotor 16 mounted on the shaft 17 and a series of mutually spaced impeller blades 18 projecting radially from the periphery of the rotor 16. The blades preferably are disposed at an angle relative to the axis of impeller rotation, and the rotor 16 may be contoured as at 16a to support the root of the blade, as best seen in FIGS. 2 and 4. While the blades are flat in the drawing, their innermost (leading edge) portions only may be so angled, with their trailing edge portions generally parallel to a plane through the rotor axis. This shaft 17 is driven by an electrical motor 20 carried in a flanged motor casing 22 which is secured directly to the housing section 10b. The shaft 17 may be journaled by any suitable means, such as the bearing 23 at the one end of the shaft and a further bearing (not shown) in the motor housing 22. Packing material or other sealing means 24 surrounds the shaft in the housing aperture adjacent to the motor to reduce leakage between the housing 10 and motor casing 22.

Extending around and affixed to the outermost periphery of the rotor blades is a ring 19, which will be more completely described later. The ring 19 offers structural support for the rotor blades and revolves with the impeller in a groove 19a formed in the housing 10 at the outer periphery of the compressor chamber 12.

Fluid to be compressed is introduced through an inlet port 26 in the housing section 10a and withdrawn through an outlet port 28 in the other housing section 10b. Ports 26 and 28 have a preferred diameter ranging between ½ and ¾ of the maximum dimension (diameter) of the cross-section of chamber 12. Their centerlines are preferably located at a radius from the shaft axis ranging between the radius r of the centerline of chamber 12 and a radius at which the sides of the ports are tangent to the outer peripheral surface of the chamber 12. The general airflow patterns in the outlet port 28 are shown by the arrows in FIG. 1. As earlier explained, the flow in the compressor is given angular velocity in the outlet port region counter to the angular velocity of the flow at the time it leaves the chamber 12. This is accomplished to a limited degree in the FIG. 1 compressor by the location of the port 28 in both the lower and upper quadrants of the chamber periphery so that a shoulder 28a is formed between the rotor disc 16 and port 28. This configuration induces a clockwise vortex of part of the flow, which is counter to the counterclockwise vortex of the flow as it enters the port 28, and results in a measure of straightening of the flow leaving the port. Further refinements of port geometry will be developed elsewhere.

Both ports 26 and 28 are angled relative to a plane normal to the axis of impeller rotation, as best seen in FIG. 3, so that the fluid entering and leaving the compressor through the ports has a velocity component tangential to the path of the rotor blades adjacent the ports. The portion of the compressor chamber occupied by the impeller blades 18 as they revolve in the chamber is referred to herein as the blade pass portion 12b and the remaining portion of the chamber, which is open, is defined as the cavity portion 12a. As seen, the portions 12a, 12b are adjacent and symmetrical about a plane normal to the chamber axis, although such symmetry is not essential to the operation of the compressor.

Disposed in the chamber cavity portion 12a is a fluid stripper 30 (shown as merely a plate in FIG. 3) which interrupts the cavity portion of the chamber and creates a positive pressure gradient in the direction of impeller rotation to establish flow of the compressed fluid through the outlet port 28 as the blades rotate. Adjacent the stripper 30 is a sealer plate 32 located in a plane generally normal to the axis of impeller rotation and extending in the direction of impeller rotation for a distance that is preferably at least as great as the peripheral pitch distance between adjacent blades. As will be explained later in more detail, the sealer plate 32, cooperating with the straight leading edges of the blades, prevents compressed fluid trapped in the peripheral cavities between adjacent blades from dumping directly into the cavity portion of the compressor chamber adjacent the inlet port 26 prior to being largely discharged through the outlet port 28.

The elements of the compressor thus far described comprise the basic parts of a compressor in accordance with the invention. In operation, fluid, e.g., air, is compressed in the annular chamber 12 by being moved around the chamber in the direction of impeller rotation (the fluid transport direction) and simultaneously moving in a vortex, or a series of vortices, about the line of fluid transport motion between the inlet and outlet ports 26, 28. Thus, as fluid enters the inlet port 26, the shape of the compressor chamber and action of the rotating impeller blades begins to induce the vortex motion of the fluid as it simultaneously moves around the compressor chamber.

Fluid entering the peripheral cavities defined between adjacent impeller blades and the interior wall of the chamber blade pass portion 12b is accelerated in the transport direction while making a half turn in the vortex direction. That is, an increment of kinetic energy is imparted to such fluid by the moving blade passage. Fluid leaving the blade passage, with both transport and vortex components of velocity, is decelerated within the cavity portion 12a. Such deceleration, according to widely accepted fluid dynamic experience, results in a corresponding increment of conversion of kinetic to potential energy, manifested as a decrease in velocity and an increase of static pressure. Thus the fluid is advanced in the transport direction against a pressure gradient created by the fluid itself in the manner described above. The half turn of the vortex in the cavity brings the stream to the entrance of some other blade passage displaced in the transport direction from the place where it had previously entered. However, the new vortex cycle starts at a higher static pressure than did the preceding cycle.

Since the increase in fluid pressure is directly related to the number of passes between the chamber portions 12a, 12b as it travels around the chamber, the outlet pressure may be increased or decreased by varying the curved transport distance between the ports 26, 28. Decreasing the angular distance decreases the outlet pressure, while an increase in the fluid transport distance results in an increase in pressure. To this end, the housing sections 10a, 10b are relatively rotatable, as noted above, to vary the output pressure in a convenient, easily controllable manner. Any suitable fastener, such as an annular adjustable clamp (not shown) may be used to secure the two sections together.

The fluid trapped between moving adjacent blades is accelerated in a vortex path following generally the contour of the wall, or surface, of the chamber blade pass portion 12b. It then enters the cavity portion 12a of the chamber, where it is decelerated in an exchange of its kinetic energy for potential energy (pressure) so that compression of the fluid takes place primarily in the cavity portion 12a. Continuing its motion, the fluid following the vortex path re-enters one of the peripheral cavities defined between adjacent impeller blades and is again accelerated and pushed into the chamber cavity portion 12a. In this manner, a single small volume of fluid follows a helical, or spiral, path around the compressor chamber, as it travels forwardly in a continuous curved line traversing the blade pass and cavity portions of the chamber. Upon reaching the region of the chamber adjacent the outlet port 28, the fluid comes into contact with the stripper 30, which separates the high and low pressure regions in the chamber 12, resulting in flow of the higher pressure air out of the chamber into the outlet port. The angled disposition of the ports 26, 28 allow introduction and withdrawal of the fluid in direction least tending to disturb the flow pattern within the compressor chamber, while the port shoulder 28a improves the flow pattern in the port and reduces turbulence. Improvements to this arrangement are discussed at a later point in connection with FIGS. 6–10.

CONTROL OF LEAKAGE FLOW

From the foregoing brief description of operation of this type of compressor, it can be readily appreciated that the greatest compressor efficiency can be obtained when the fluid assumes the desired vortex motion as soon as possible after entering the inlet port, and when leakage from high pressure areas in the chamber to low pressure areas can be either reduced to a minimum or otherwise used to air vortex motion of the fluid. By the very nature of construction of regenerative compressors of this type, such leakage is inevitable, since clearance gaps must be provided between the impeller and housing sections, as shown at 34 and 36, as well as between the motor shaft 17, and the housing section 10b. Among the more important disadvantages of leakage flow in the gaps 34 and 36 from high pressure regions in the chamber to regions of lower pressure are its tendency to distort the vortex motion such that it is confined to less than the whole cross-sectional area of the chamber, and its tendency to introduce turbulence that spoils streamline spiral motion of the fluid, as observed in FIG. 5A.

In the compressor illustrated in FIGS. 1–3, the degenerative effects of leakage flow in the clearance gaps have been largely eliminated. To this end, the housing section 10b is formed with a series of curved ridges 38 (FIG. 2) adjacent one side of the boundary of the rotor disc 16 and extending generally transversely, and preferably normal, to the direction of leakage flow in the gap. The flow streamlines in the clearance gap 36 are a series of curved lines 39 diverging from a region of high pressure near the outlet port and converging to a point of low pressure about the inlet port. Consequently, the ridges 38 define a series of mutually spaced passages 38a diverging generally away from the inlet and outlet port regions. Without the ridges 38 and assuming no friction alongside the rotor disc and opposed housing wall, the fluid in the gap 36 would be accelerated by the existing pressure differential to some maximum velocity at the point of exit into the compressor chamber in the low pressure region. In the presence of the ridges, however, the fluid is repeatedly accelerated and decelerated as it passes over the ridges into the curved passages between them so that the pressure differential between chambers 38a is a fraction of the total pressure drop between high and low pressure regions. That fractional pressure is related to the number of acceleration and deceleration cycles undergone by the fluid in traveling through the gap 38, each acceleration-deceleration cycle occurring as the leakage flow passes over a ridge into the following curved passage.

Under idealized conditions, the velocity of the fluid over the ridges is proportional to the square-root of the pressure differential across any one ridge. Thus, for example, where the leakage flow travels over nine spaced ridges, the pressure differential across any one ridge will approximate ⅑ of the total pressure drop, and the velocity of the leakage flow at its point of exit from the gap into the chamber falls to ⅓ ($\sqrt{1/9}$) of the value it would assume without the ridges. A reduction of the exit velocity into the low pressure regions of the chamber, of course, reduces the associated dynamic pressure forces exerted by the leakage flow on the spiral flow in the chamber, thus tending to minimize vortex flow distortion and turbulence of the kind shown in FIG. 5A.

Leakage flow through the clearance gap 34 between the housing section 10a and the other side of the rotor 16 is treated somewhat differently. In this case, the leakage flow can be usefully directed into the compressor chamber such that its exit velocity into the low pressure regions of the chamber is generally tangential to the desired fluid vortex motion. To accomplish this, a curved flow directing passage, or nozzle 41 (FIG. 5B), is formed between the periphery of the rotor 16 and a curved member 40 extending at least partially around the chamber 12 and projecting into the chamber cavity portion 12a. The leakage flow in the gap 34, upon reaching the member 40, is deflected in a direction substantially tangential to the desired vortex fluid motion, as illustrated schematically in FIG. 5B. Viscous coupling between the deflected leakage flow and fluid in the chamber 12 then initiates vortex motion of the latter as it is dragged along with the flow from the small curved nozzle 41. Additionally, the member 40 forms a slot 42 curving around the wall of the chamber cavity portion 12a and opening into a similarly curved outlet 42a adjacent the leakage passage 34. The slot 42 bleeds off the stagnant boundary layer between chamber wall and the fluid having vortex motion in the chamber. Such depletion of the boundary layer tends to induce the fluid vortices to follow the actual boundary of the compressor chamber, thereby decreasing the vortex distortion and turbulence in the chamber.

As can be seen from FIG. 1, back-flow leakage may also occur in a similar manner around the outer periphery of the compressor chamber in the gap between the impeller blade ring 19 and groove 19a. To reduce such leakage to a minimum, the ring 19 is constructed to include a succession of radially extending projections 45 (FIG. 4) forming with the groove 19a a like succession of communicating chambers 40 which rotate with the impeller to decrease the circumferential back-flow of fluid in the annular groove 19a. In principle, the pressure differential existing between adjacent chambers 46 at either side of a projection 45 is balanced by the pressure drop caused by relative movement of the fluid accelerated through the small opening 48 between the ends of the projections 45 and the groove 19a upon rotation of the impeller. In a perfectly designed arrangement, therefore, a substantially stagnant ring of fluid seals the space between the ring 19 and groove 19a against circumferential back-flow. By way of example, the clearance 48 between the projection ends and the groove 19a may be about ⅕ of the distance between the ring 19 and the same surface of the groove 19a.

The leakage flow around the shaft 17 (FIG. 1) may also be used beneficially to provide supplemental cooling to the windings of the motor 20. As depicted in FIG. 1, some of the gap flow passing over the ridges 38 inevitably passes through the packing material 24 and into the motor housing 22. Flow in this case is directed outwardly on the assumption that the pressure in the compressor chamber is above atmospheric pressure. In the event that the compressor is used as a suction pump, the flow around the motor shaft 17, will, of course, be directed from the motor casing into the compressor chamber. In either case, however, a supplemental cooling effect on the motor can be realized.

INLET AND OUTLET PORTS

Mechanical designers of regenerative compressors have recognized the importance of proper stripper, or baffle, configuration and location in the compressor chamber in order to allow for withdrawal of the compressed fluid of the chamber without upsetting to a harmful extent the fluid spiral streamlines. Laboratory experiments have confirmed, however, that proper design of the inlet port is equally important to an efficient regenerative compressor. Assuming for the moment that the approach of fluid entering the chamber from the inlet port is normal to the straight edges of the blades 18 adjacent the chamber cavity portion 12a, it is apparent that the plane of the blade is aerodynamically stalled with respect to the incoming fluid. In this condition, parasitic vortices or tornadoes, having axes of rotation generally parallel to the impeller blade edges are set up behind the moving blades. Those vortices are compounded by additional unwanted vortex or tornado motion of the incoming fluid caused by fluid back-flow along the wall of the compressor chamber toward the inlet port region. This parasitic vortex motion of the fluid near the low pressure intake region of the compressor chamber hinders formation of the desired vortex fluid motion in which the axis of fluid revolution is generally tangential to the direction of fluid transport around the chamber. Those parasitic vortices tend to be carried around the chamber with the impeller blades, with the direction of their axes remaining relatively fixed. As a result, the tornado axes do not correspond to the desired axis of vortex fluid motion until they travel approximately 25% of the curved distance between the inlet and outlet ports, at which time the axes of the tornadoes coincide with the axis of desired fluid vortex motion. Thus, up to 25% of the transport regenerative compression is lost merely from the natural consequences of introducing fluid straight into the chamber.

Figures 5A, 5B, 7:
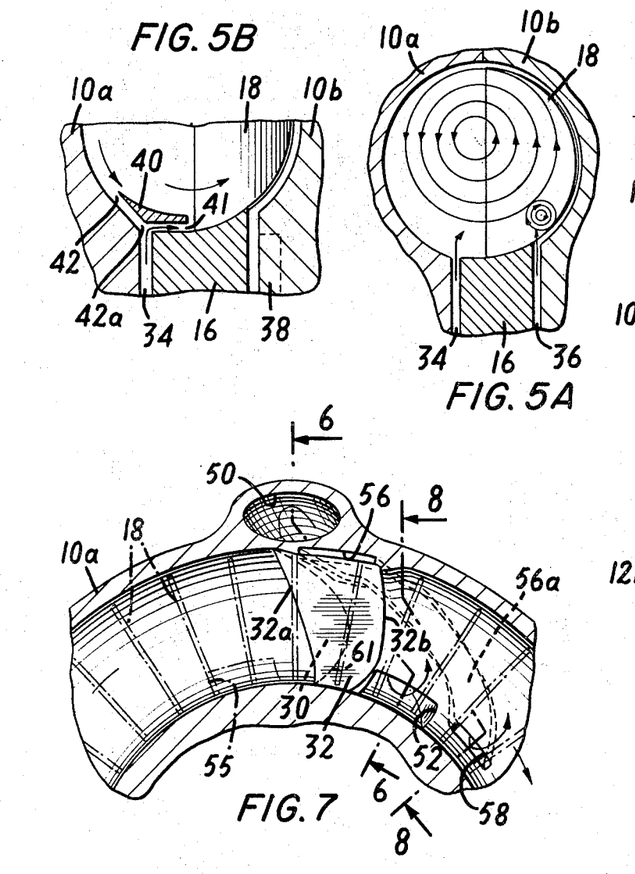
FIG. 5A is an enlarged cross-sectional schematic representation of the annular compressor chamber in the FIG. 1 compressor, showing the air flow patterns in the chamber and adjacent the periphery of the impeller rotor.
FIG. 5B is an enlarged partial cross-sectional view of the FIG. 1 compressor, showing the flow patterns of fluid flow in the compressor chamber.
FIG. 7 is a cross-sectional view of a portion of the compressor housing taken along the line 7—7 in FIG. 6.
Figure 6:
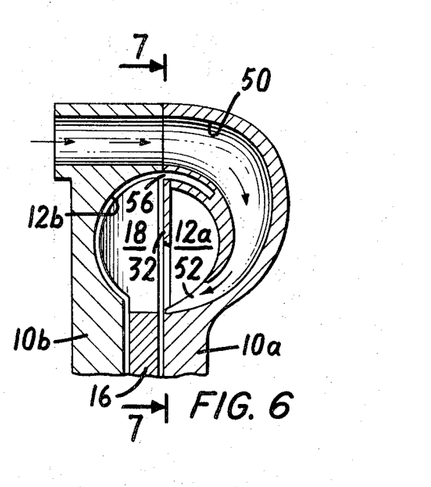
FIG. 6 is an elevational view of a portion of the compressor housing in cross-section, showing the construction of a preferred form of inlet port for regenerative compressors according to the invention.
Figure 8:
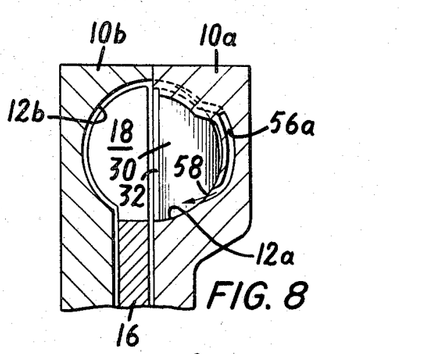
FIG. 8 is a further cross-sectional view of the compressor housing, taken along the line 8—8 in FIG. 7.

FIGS. 6–10 depict preferred forms of improved intake and outlet ports for the regenerative compressor of FIG. 1, each designed to substantially reduce aerodynamic stall of the impeller blades and the resultant parasitic fluid vortices within the chamber. Referring to FIGS. 6–8, the compressor housing sections 10a, 10b are formed to define a convolute inlet passage 50 which has an elongate slightly curved opening 52 near the inner periphery, or lower quadrant, of the compressor chamber cavity portion 12a and displaced from upstream portions of the passage 50 in the direction of fluid transport. The port passage 50 progressively decreases in cross-sectional area in the direction of fluid motion to accelerate the fluid entering the compressor chamber, and the opening 52 may be dimensioned and located in respect of the transport direction to correspond to the width of the stream in the chamber. If, for example, the stream undergoes between 10 and 30 vortex revolutions in the chamber 12 under normal operating parameters, the dimension of the opening 52 may be between ⅒ (36°) and ⅟₃₀ (12°) of the transport distance.

The convolute shape of the inlet port 50 imparts vortex motion to the fluid prior to its entry into the compressor chamber 12 (FIG. 6), and the downstream location of the opening 52 gives the incoming fluid a substantial velocity component in the direction of fluid transport, as well (FIG. 7). In FIG. 7, the relative positions of the straight blade edges in the chamber portion 12b are shown by the phantom lines, with the direction of impeller rotation being clockwise.

Since the fluid has both transport and vortex motion upon entering the compressor chamber 12, the planes of the blades form acute angles with the incoming fluid, reducing aerodynamic blade stall and the accompanying parasitic vortices. In addition, imparting a substantial velocity component in the fluid transport direction decreases back-flow of the fluid along the compressor chamber wall. Employment of the convolute, or scrolled, inlet port thus guides the incoming fluid in a manner which initiates regenerative compression in the chamber far earlier than would be the case with conventional port design.

Figure 9:
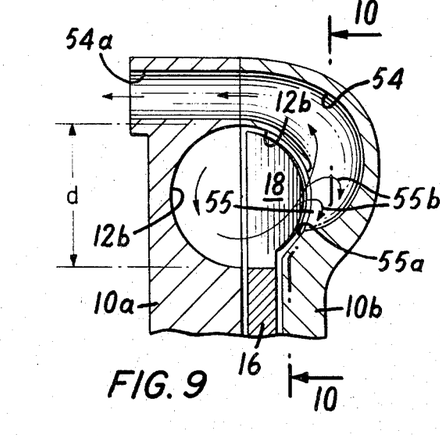
FIG. 9 is a cross-sectional elevational view of a portion of a compressor housing, showing a preferred arrangement of compressor outlet port.
Figure 10:
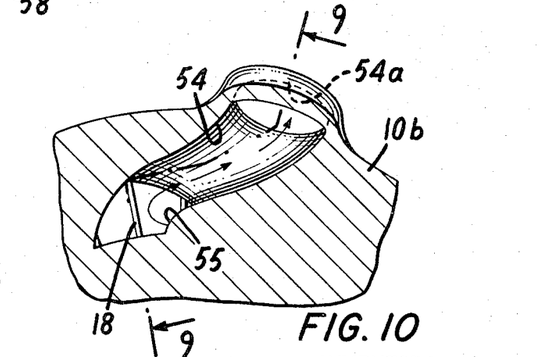
FIG. 10 is a cross-sectional view of compressor housing, taken generally along the line 10—10 in FIG. 9.
Figure 11:
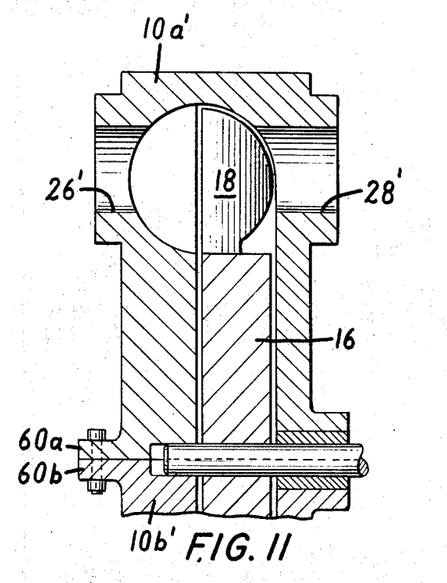
FIG. 11 is an elevational view in cross-section of a modified form of compressor, in which the housing is divided into mating half-sections through its diameter.

FIGS. 9 and 10 show a similar construction for the outlet port 54, which is convolute also and communicates with the blade pass portion 12b of the chamber through a curved elongate opening 55, located in both the upper and lower quadrants of the blade pass portion of the chamber. In relation to the transport direction of the fluid, the opening 55 is upstream of the port portion 54a where the fluid is taken from the compressor. The portion 54a is geometrically oval, having axes in the ratio of about $d:d/4$, where $d$ is the diameter of the chamber cross section. The compressed fluid, therefore, is discharged from the compressor chamber at an exit velocity having a substantial component tangent to the line of fluid transport motion, in addition to having a circular line of motion in the convolute port 54 to promote a smooth flow transition from within the chamber to points outside the chamber.

As in the case of the simple outlet port configuration of FIG. 1, the port opening 55 induces the stream to follow the contour of the chamber portion 12b for part of its vortex revolution before it is allowed to exit. Thus the shoulder 55a causes the formation of the counter spin (shown by arrows 55b) whose velocity profile averages with that of the undesired angular velocity to straighten the flow in the outlet port, in the manner previously explained.

It has been found, in compressors of the construction shown in FIG. 1, that not all of the compressed fluid trapped between adjacent blades in the outlet opening region is completely extracted through the outlet port. As a consequence, some high pressure fluid tends to be injected into the inlet port region as the blades pass the cavity sealer or dividing plate 32, disrupting the flow patterns in the inlet port region of the chamber and, of course, inherently impairing the efficiency of regenerative compression by delaying initiation of the proper vortex motion. In the construction shown in FIGS. 6–8, however, such trapped fluid is recycled into the compressor chamber 12 downstream of the inlet port opening 52 so that it is usefully employed to prompt vortex motion of the incoming fluid.

Returning to FIGS. 6–8, the sealing, or dividing, plate 32 has a narrow curved opening 56 positioned to receive from the blades instantaneously between the inlet and outlet port openings 52, 55 (FIG. 7) fluid which is at some pressure intermediate the pressures at the inlet and outlet ports. The opening 56 follows externally around the chamber cavity portion 12b in the form of a passage 56a to a point downstream of the inlet port opening 52 and opens into the cavity portion 12b at 58. The passage 56a in the housing section 10a is preferably thin enough so that air entering it from the blades (the straight edges of which are indicated by the phantom lines in FIG. 7) is laminar. The laminar flow exits from the opening 58 into the compressor chamber at a directional velocity substantially tangential to the desired vortex motion, as seen in FIG. 8, and having a component in the transport direction, as well. The distance of the opening 58 downstream of the inlet port opening 52 is subject to design and the specific requirements of the compressor. As an example, its downstream distance may correspond to the position of the second or third vortex revolutions of the fluid after having entered the compressor chamber from the inlet port 50.

As seen from FIG. 7, the sealer plate has curved upstream and downstream edges 32a, 32b and is constructed so that its dimension in the direction of fluid transport near the rotor periphery is at least equal to the pitch distance between adjacent impeller blades. The extent of the plate at the outer periphery of the compressor chamber, on the other hand, preferably at least approximates the distance at that point between all blades between the high pressure outlet region and the low pressure inlet region. Usually, that distance exceeds twice the impeller blade pitch distance. In general, the minimum flat dimension of the plate 32 near the outer periphery of the compressor chamber 12 is a multiple (1, 2, 3 . . .) of the pitch distance between adjacent impeller blades, with the dimension of the plate increasing from near the rotor periphery to the outer periphery of the chamber.

The angled stripper plate 30 is downstream of the outlet port opening 55 and presents a surface which at least partially blocks the flow of fluid in the direction of impeller rotation. As observed in FIG. 7, points of intersection of the stripper surface with the surface of the chamber cavity portion 12a are downstream of the upstream edge 32a. The specific angle between the stripper plate 30 and a plane normal to the axis of impeller rotation will depend on the particular design of the compressor, but in general will be disposed to conform to or preserve the spiral motion of the fluid as it passes from the compressor chamber into the outlet port opening 55 and may assume a more flow-contoured configuration than indicated by the flatness of the plate 30. The exact shape of the plate 30 can be developed by known thixotropic paint tracing techniques, for example, which provide outlines on the chamber interior of the flow streamlines, if any, in the outlet port vicinity. In general, however, the surface of the plate 30 will be tangent at any point to a plane forming an acute angle with a plane passing through the impeller axis, with the downstream edge of the plate intersecting the boundary of the cavity 12a.

During operation, fluid enters the convolute inlet port 50, and is given a spiral motion conforming generally to the desired motion of the fluid in the compressor chamber. The velocity components of the incoming fluid are such that excessive turbulence and flow distortion resulting from fluid impinging incorrectly upon the impeller blades 18 are substantially reduced, and some of the fluid assumes regenerative spiral motion almost immediately upon entering the chamber. The fluid continues its vortex motion as it simultaneously moves around the chamber by the action of the moving impeller blades. Upon approaching the region of outlet port, the compressed fluid encounters the stripper 30 and travels under the influence of the pressure gradient into the outlet port opening 55, after which the fluid continues its spiral motion through the outlet port 54.

Since the fluid, upon exiting from the chamber 12, is allowed to continue in a direction approximating the direction in which it was last traveling in the chamber, a smooth flow transition is achieved, thus preserving the spiral line of fluid motion within the chamber from the high to low pressure zones on either side of the stripper. Additionally, counterspin vortices induced by the shape and location of the outlet opening 55 provide an effective measure of flow straightening and reduction of turbulence prior to exit of the flow from the port portion 54a.

Intermediate pressure fluid trapped between adjacent blades opposite the sealing plate 32 sees a low pressure "sink" at the small opening 56, and passes into the bypass, or recycling, passage 56a. That fluid subsequently exhausts in a laminar stream into the chamber 12 with a motion coinciding with the desired motion to be imparted to the fluid entering the chamber through the inlet port 50. As a result, fluid entering the chamber from each of the inlet openings 52, 58 possesses the desired directional velocity, tending to induce substantially complete spiral fluid motion early in the transport regenerative compression cycle.

From the foregoing description, it is apparent that compressors with unshrouded impeller blades, that is, blades which are not enclosed at the edges adjacent the housing, make possible optimum porting arrangements to and from the compressor chamber. Moreover, as will become apparent shortly, straight-through porting from one housing section to the other in each stage of a multistage compressor is not only convenient but avoids the radical changes in fluid direction necessary in regenerative compressors known in the art. Although the housings of the compressors thus far described are split into sections which meet along a plane generally normal to the axis of impeller rotation, the housings 10a', 10b' can be divided alternatively along a plane passing through the rotational axis, as shown in FIG. 10. In this instance, the disc-shaped impeller rotor 16 preferably has an axial dimension equal to that of the impeller blades 18. This permits assembly and disassembly of the compressor by simply removing one of the housing sections, say 10a', with the minimum running clearance between the housings and impeller rotor being preserved. Both inlet and outlet ports 26', 28' are formed in one housing section 10a', rather than being located each in a respective housing section as shown in FIG. 1. The sections are suitably flanged at 60a and 60b for assembly and fastening by conventional means. Aside from this variation, the remaining parts of the compressor may be identical to those already described.

MULTISTAGE COMPRESSORS AND FLUID COOLING

Figure 12:
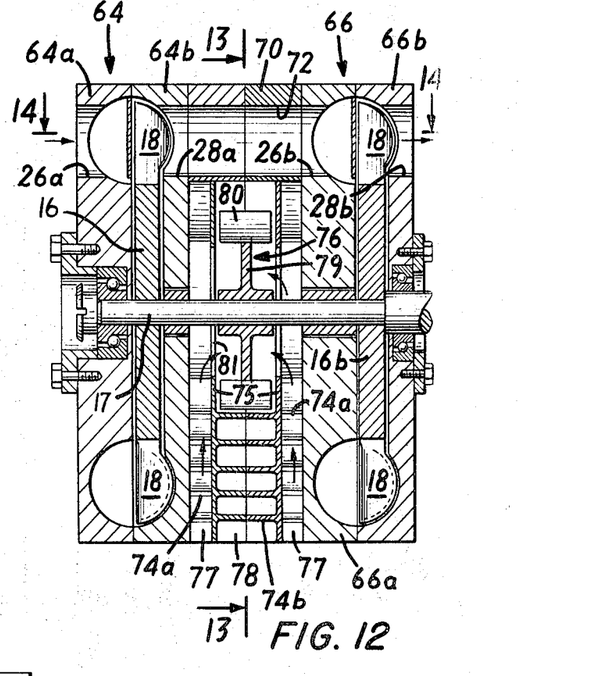
FIG. 12 is a cross-sectional elevation view of a multi-stage compressor according to the invention, including means for cooling the air flow through the compressor.
Figure 13:
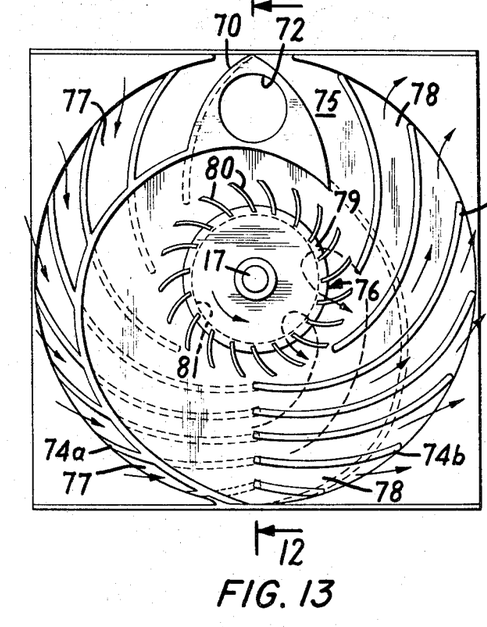
FIGS. 13 and 14 are cross-sectional views of the multi-stage compressor taken along the respective lines 13—13 and 14—14 in FIG. 12.
Figure 14:
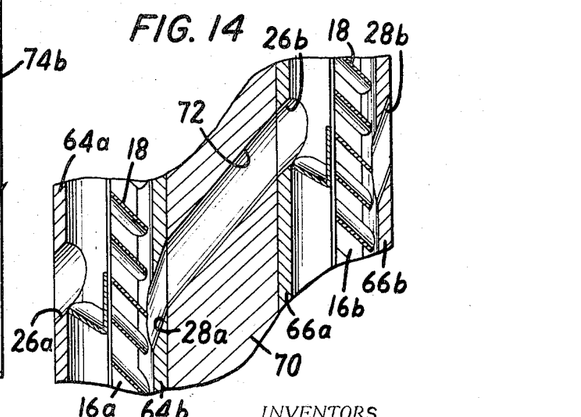

As noted briefly, compressors according to the present invention are ideally suited for multistage installations, a representative embodiment of which is shown in FIGS. 12–14. Turning to FIG. 12, the multistage compressor comprises two identical individual compressor stages 64 and 66 including housing sections 64a, 64b and 66a, 66b each similar to the housing sections illustrated in FIG. 1. The respective inlet ports and outlet ports 26a, 26b and 28a, 28b are angled with respect to a plane normal to the axis of impeller rotation, as shown in FIG. 14. Coupling the stages together and disposed between the housings of the stages 64, 66, however, is a mating two-piece spacing assembly 70 including an interstage port 72 which is similarly angled to form a smoothly contoured passage (FIG. 14) between the outlet port 28a of stage 64 and the inlet port 26b of the stage 66. The view of FIG. 12 is taken generally along the centerlines of the ports 26, 28 and passage 72 for purpose of clarity.

Up until the present time, very few small through intermediate size regenerative compressors of this type have employed compact, simple apparatus for extracting heat or otherwise cooling the compressed fluid. It is apparent, however, that such cooling may be necessary in several applications. For example, a compressor which raises the pressure of the fluid from atmospheric pressure to 10 p.s.i. under ideal adiabatic compression conditions and at room temperature brings about a temperature rise of about 80° F. In compressors having an efficiency of no greater than 50%, the temperature rise of the fluid during compression approximates 180° F., less any cooling caused by heat losses to the ambient environment. Conventional cooling means in such cases usually comprises an interstage cooling system between stages and a final cooling system used after the last compression stage. cooling requiring a system for circulating a suitable refrigerant or other cooling fluid. The cooling scheme of FIGS. 12 and 13, however, provides adequate cooling of the compressed fluid while at the same time minimizing overall dimension of the compressor.

Referring to FIGS. 12 and 13, the lower section of the spacing assembly 70 includes a series of mutually spaced curved fins 74 (FIG. 13) defining a like series of cooling air passages converging radially inwardly toward a cooling fan impeller 76. The fins 74 are segmented by plates 75 extending normal to the axis of the shaft 17 to form cooling inlet channels 77 adjacent the housing sections 64b, 66a and central cooling air exhaust channels 78 receiving the air from the impeller 76. In this regard, it will be understood that the interstage spacing assembly 70 may be fabricated integrally with one or both of the compressor housing sections.

The cooling impeller 76 is mounted for rotation on the same shaft 17 to which the compressor stage impeller rotors 16a, 16b are affixed and comprises a small rotor disc 79 supporting at its periphery the cooling fan impeller blades 80. As the shaft 17 rotates, ambient air is sucked into the convergent inlet passages 77 between the cooling fins 74a, where it passes through central apertures 81 in the plates 75, and is exhausted through the set of diverging passages 78 formed between the fins 75b. As the cooling air flows between the fins of the spacing assembly, it extracts heat from the compressor housings 64, 66 and the portion of the assembly defining the interstage port 72. It is apparent that the location of the passages 77, 78 is such that incoming air contacts the housing surfaces to be cooled, whereas the warmer exhausting air is unexposed to those surfaces. The situation of the fins 74 and impeller 76 according to the invention is seen, therefore, to offer a relatively efficient, simple expedient for cooling the compressor housings to maintain the compressed fluid within acceptable temperature limits.

From the foregoing description of the invention and its various aspects, it can be appreciated that the invention provides improved forms of regenerative compressors having annular compressor chambers. Compressors using one or more of the features of the present disclosure can be constructed with appreciably greater efficiency without a concomitant increase in bulk or complexity. The compressor offers versatility from a basic design which is adaptable to mass production assembly, and which may be constructed to match various requirements through the combination of two or more individual compressor stages.

Although the invention has been described with reference to specific embodiments thereof, several modifications and variations, both as to general form and detail, may be made within the skill of the art. Accordingly, all such variations and modifications are intended to be included within the spirit and scope of the appended claims.

We claim:
1. A regenerative compressor, comprising:
   a stationary housing defining an annular compressor chamber comprised of adjacent communicating annular blade pass and cavity portions and having inlet and outlet ports communicating with the chamber,
   an impeller supported in the housing for rotation about the axis of the compressor chamber and comprised of a rotor and a series of unshrouded mutually spaced blades projecting radially from the rotor periphery and occupying the blade pass portion of the chamber,
   the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet port upon rotation of the impeller;
   the outlet port being located in the blade pass portion of the chamber adjacent the impeller blades, and the blade pass portion having vortex-creating means exposed to the flow for inducing angular velocity of at least part of the flow in the outlet port counter to the direction of the angular velocity of the flow entering the outlet port; and
   flow stripper means interrupting the cavity portion of the chamber for preserving a pressure gradient therein to establish flow of the compressed fluid through the outlet port.

2. A regenerative compressor as set forth in claim 1, in which:
   the annular chamber is of generally rounded cross-section.

3. A regenerative compressor as set forth in claim 1, in which:
   the edges of the blades adjacent the cavity portion of the chamber are generally parallel to a plane normal to the rotational axis of the impeller.

4. A compressor as defined in claim 1, in which:
   at least the leading edge portions of impeller blades are angled with respect to a plane through the rotational axis such that the edges of the blades adjacent the surface of the chamber blade pass portion trail the blade edges adjacent the chamber cavity portion.

5. A compressor as defined in claim 2, in which:
   the rotor periphery is contoured adjacent the roots of the blades to conform to the rounded geometry of the annular chamber.

6. A compressor as defined in claim 1, in which:
   the outlet port is disposed to have parts thereof in quadrants of the chamber blade pass portion separated by the centerline radius of the chamber.

7. The compressor of claim 1, in which:
the inlet port communicates with the cavity portion of the chamber.

8. The compressor of claim 7, in which:
the inlet port is formed to impart to the velocity of the fluid entering the chamber a component in the direction of fluid transport.

9. The compressor of claim 7, in which:
the outlet port is formed to withdraw fluid from the chamber at a velocity having a component in the direction of fluid transport.

10. The compressor of claim 7, in which:
the inlet port is elongate and curved along the general direction of fluid transport, the elongate dimension of the inlet port being 1/10 and 1/30 of the total curved transport distance defined by the cavity portion of the chamber.

11. A compressor according to claim 1, in which:
the largest dimension of the rotor in the direction of its axis of rotation is at least as great as and is axially coextensive with the largest dimension of the impeller blades in the same direction.

12. A compressor as defined in claim 1, in which:
ones of the inlet and outlet ports are located in a respective housing section and
the housing is comprised of first and second mating sections meeting along a plane normal to the impeller axis, one of such sections providing a circumferential recess and the other section having a complementary annular projection slidably received in the recess to make the sections relatively rotatable, whereby the curved distance of the compressor chamber between the inlet and outlet ports may be varied.

13. A regenerative compressor, comprising:
a stationary housing defining an annular compressor chamber comprised of adjacent communicating annular blade pass and cavity portions and having inlet and outlet ports communicating with the chamber;
the inlet port having associated therewith a convolute passage in the housing constructed to impart vortex motion to the fluid entering the compressor chamber, the passage progressively converging along the direction of flow therein for accelerating the fluid to entry into the compressor chamber;
an impeller supported in the housing for rotation about the axis of the compressor chamber and comprised of a rotor and a series of unshrouded mutually spaced blades projecting radially from the rotor periphery and occupying the blade pass portion of the chamber;
the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller; and
flow stripper means interrupting the cavity portion of the chamber for preserving a pressure gradient therein to establish flow of the compressed fluid through the outlet port.

14. A regenerative compressor as defined in claim 13, in which:
the convolute passage additionally imparts to the velocity of the entering fluid a component in the direction of fluid transport.

15. A regenerative compressor according to claim 13, in which:
the outlet port has associated therewith a divergent convolute passage in the housing for decelerating the fluid and preserving the direction of motion of the fluid leaving the compressor chamber therethrough.

16. A regenerative compressor according to claim 15, in which:
the outlet passage is elliptical in cross-section at the exit portion thereof.

17. A regenerative compressor as defined in claim 15, in which:
the axis of the outlet part convolute passage has a component tangential to the direction of fluid transport at the outlet port.

18. A regenerative compressor, comprising:
a stationary housing defining an annular compressor chamber comprised of adjacent communicating annular blade pass and cavity portions and having inlet and outlet ports communicating with respective chamber portions;
an impeller supported in the housing for rotation about the axis of the compressor chamber and comprised of a rotor and a series of unshrouded mutually spaced blades projecting radially from the rotor periphery and occupying the blade pass portion of the chamber,
the blades having edges conforming to the cross-sectional geometry of the blade pass portion of the chamber and defining between adjacent ones thereof and the blade pass chamber portion a series of peripheral cavities about the line of fluid transport between the inlet and outlet ports upon rotation of the impeller; and
flow stripper means interrupting the cavity portion of the chamber for preserving a pressure gradient therein to establish flow of the compressed fluid through the outlet port,
the flow stripper means including an upstream edge adjacent the blade pass portion and a surface downstream thereof to at least partially block flow in the direction of impeller rotation,
the stripper surface extending from the upstream edge to intersect the boundary of the cavity portion downstream of said upstream edge.

19. A regenerative compressor as set forth in claim 18, further comprising:
means separating the cavity and blade pass portions of the compressor chamber and providing a surface intersecting the surface of the stripper means,
the separation surface extending from the points of intersection with the stripper surface in the direction of fluid transport a distance at least equal to the pitch distance between adjacent impeller blades.

20. A regenerative compressor as defined in claim 19, in which:
the extent distance of the separating surface is greater at an outer periphery of the annular compressor chamber than at the inner periphery thereof.

21. A regenerative compressor as set forth in claim 20, in which:
the extent distance at the outer periphery is at least equal to twice the pitch distance between adjacent impeller blades.

22. A regenerative compressor, comprising:
a stationary housing defining an annular compressor chamber comprised of adjacent communicating annular blade pass and cavity portions and having inlet and outlet ports communicating with the chamber,
an impeller supported in the housing for rotation about the axis of the compressor chamber and comprised of a rotor and a series of unshrouded mutually spaced blades projecting radially from the rotor periphery and occupying the blade pass portion of the chamber,
the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller, flow stripper means interrupting the cavity portion of the chamber for preserving a pressure gradient therein to establish flow of the compressed fluid through the outlet port; and means for recycling a portion of the fluid compressed in the compressor chamber from a region adjacent the stripper means to a region of the chamber adjacent the inlet port to recompress the recycled fluid.

23. A regenerative compressor according to claim 22, in which:

the exhaust opening is downstream of the inlet port.

24. A regenerative compressor, comprising:

a stationary housing defining an annular compressor chamber comprised of adjacent communicating annular blade pass and cavity portions and having inlet and outlet ports communicating with the chamber;

an impeller supported in the housing for rotation about the axis of the compressor chamber and comprised of a rotor and a series of unshrouded mutually spaced blades projecting radially from the rotor periphery and occupying the blade pass portion of the chamber, the rotor forming a disc-shaped boundary to define gaps between the sides thereof and adjacent sides of the housing, allowing fluid flow from high to low pressure areas in the compressor chamber, at least one of the adjacent housing surfaces including a series of ridges extending transversely of the direction of fluid flow in the gap, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller; and flow stripper means interrupting the cavity portion of the chamber for preserving a pressure gradient therein to establish flow of the compressed fluid through the outlet port.

25. A compressor as defined in claim 24, in which:

the ridges are everywhere normal to the average direction of fluid flow in the gap.

26. A regenerative compressor, comprising:

a stationary housing defining an annular compressor chamber comprised of adjacent communicating annular blade pass and cavity portions and having inlet and outlet ports communicating with the chamber;

an impeller supported in the housing for rotation about the axis of the compressor chamber and comprised of a rotor and a series of unshrouded mutually spaced blades projecting radially from the rotor periphery and occupying the blade pass portion of the chamber, the rotor forming a disc-shaped boundary to define gaps between the sides thereof and adjacent sides of the housing, allowing fluid flow from high to low pressure areas in the compressor chamber, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller; and flow stripper means interrupting the cavity portion of the chamber for preserving a pressure gradient therein to establish flow of the compressed fluid through the outlet port; and means for guiding the fluid flow entering the chamber cavity portion from the gap in a direction substantially tangential to the desired vortex motion of the fluid in the compressor chamber.

27. A regenerative compressor according to claim 26, in which:

the guide means comprises a curved member extending at least partially around the inlet half of the transport distance of the chamber cavity portion and projecting thereinto to form with the periphery of the rotor a curved elongate nozzle exit for the fluid flow in the gap.

28. A regenerative compressor, comprising:

a stationary housing defining an annular compressor chamber comprised of adjacent communicating annular blade pass and cavity portions and having inlet and outlet ports communicating with the chamber;

an impeller supported in the housing for rotation about the axis of the compressor chamber and comprised of a rotor and a series of unshrouded mutually spaced blades projecting radially from the rotor periphery and occupying the blade pass portion of the chamber, the rotor forming a disc-shaped boundary to define gaps between the sides thereof and adjacent sides of the housing, allowing fluid flow from high to low pressure areas in the compressor chamber, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller, flow stripper means interrupting the cavity portion of the chamber for preserving a pressure gradient therein to establish flow of the compressed fluid through the outlet port; and means for depleting a fluid boundary layer created between the chamber cavity portion wall and the fluid having vortex motion in the compressor chamber.

29. A regenerative compressor as defined in claim 28, in which the boundary layer depletion means comprises:

means associated with the chamber cavity portion forming a curved slot in at least a portion of the wall thereof to accept fluid from the boundary layer, the slot having an outlet leading into the gap communicating with the chamber cavity portion.

30. A regenerative compressor, comprising:

a stationary housing defining an annular compressor chamber comprised of adjacent communicating annular blade pass and cavity portions and having inlet and outlet ports communicating with the chamber, the housing further having an annular channel opening into the compressor at the radially outermost periphery thereof;

an impeller supported in the housing for rotation about the axis of the compressor chamber and comprised of a rotor, a series of unshrouded mutually spaced blades projecting radially from the rotor periphery and occupying the blade pass portion of the chamber, and an annular ring supporting the edges of the impeller blades and occupying at least a portion of the annular channel in the housing, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller; and flow stripper means interrupting the cavity portion of the chamber for preserving a pressure gradient therein to establish flow of the compressed fluid through the outlet port.

31. A regenerative compressor comprising:

a pair of stationary housings each defining a coaxial annular compressor chamber comprised of adjacent blade pass and cavity portions and each having inlet and outlet ports, ones of the inlet and outlet ports in each housing being located in a respective chamber portion, the inlet port of one housing and the outlet port of the other housing providing an opening to opposite sides of the respective housings;

an impeller supported in each housing for rotation about an axis of the compressor chambers and comprised of a rotor and a series of unshrouded mutually spaced blades projecting radially from the rotor periphery and occupying the blade pass portion of a respective chamber, the blades conforming generally to the cross-sectional geometry of the blade pass chamber portion and defining between adjacent ones thereof and said chamber portion a series of peripheral cavities to induce vortex motion of a fluid about the line of fluid transport in the chamber between the inlet and outlet ports;

flow stripper means interrupting the cavity portion of each chamber for preserving a pressure gradient therein resulting in flow of the compressed fluid through the outlet port; and spacer means interposed between the first and second housings and including a passage connecting the openings to the sides of the housings.

32. A regenerative compressor, comprising:

a stationary housing defining an annular compressor chamber comprised of adjacent communicating annular blade pass and cavity portions and having inlet and outlet ports located in and communicating with respective portions of the chambers, an impeller comprised of a disk supported on a rotatable shaft for rotation about the axis of the compressor chamber and a series of unshrouded mutually spaced blades projecting radially from the periphery and occupying the blade pass portion of the chamber, the disk defining with an opposed surface of the housing a first leakage gap extending from the compressor chamber to the shaft, the blades conforming generally to the cross-sectional geometry of the blade pass portion to induce vortex motion of a fluid in the chamber about the line of fluid transport between the inlet and outlet ports upon rotation of the impeller, the housing and shaft forming therebetween an annular shaft leakage gap;

flow stripper means interrupting the cavity portion of the chamber for preserving a pressure gradient therein to establish flow of the compressed fluid through the outlet port; and a motor secured to an end of the housing for rotating the shaft and arranged to receive cooling fluid flow through the first and shaft leakage gaps.

33. A compressor as defined in claim 32, in which the cooling means comprises:

a series of mutually spaced cooling fins disposed between the housings about a cooling fan mounted for rotation with one of the compressor impellers.

34. A compressor as defined in claim 33, in which:

the cooling fins are curved in the direction of rotation of the cooling fan to define a series of cooling passages diverging generally radially from the periphery of the cooling fan to circulate an ambient fluid in the space between the housings.

35. A regenerative compressor according to claim 34, further comprising:

means disposed in the space between the housings for directing the incoming ambient fluid in a path adjacent the housings to extract heat therefrom, and for exhausting the ambient cooling fluid from the space in a path unexposed to the housings.

36. A regenerative compressor according to claim 1, in which:

the outlet port is displaced radially outwardly from the radially innermost portion of the compressor chamber.

37. A regenerative compressor according to claim 36, in which:

the vortex creating means comprises a shoulder formed at the inner surface of the blade pass portion adjacent the outlet port and being effective to induce counterspin of the flow entering the outlet port from the compressor chamber.

38. A regenerative compressor, comprising:

a stationary housing defining an annular compressor chamber comprised of adjacent communicating annular blade pass and cavity portions and having inlet and outlet ports communicating with the chamber, the inlet port having associated therewith a convolute passage in the housing constructed to impart vortex motion to the fluid entering the compressor chamber, an impeller supported in the housing for rotation about the axis of the compressor chamber and comprised of a rotor and a series of unshrouded mutually spaced blades projecting radially from the rotor periphery and occupying the blade pass portion of the chamber, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller;

flow stripper means interrupting the cavity portion of the chamber for preserving a pressure gradient therein to establish flow of the compressed fluid through the outlet port; and means associated with the outlet port to induce a counterspin motion to the fluid in the port counteracting continued vortex motion in the outlet passage.

39. A regenerative compressor, comprising:

a stationary housing defining an annular compressor chamber comprised of adjacent communicating annular blade pass and cavity portions and having inlet and outlet ports communicating with the chamber:

an impeller supported in the housing for rotation about the axis of the compressor chamber and comprised of a rotor and a series of unshrouded mutually spaced blades projecting radially from the rotor periphery and occupying the blade pass portion of the chamber;

the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller, flow stripper means interrupting the cavity portion of the chamber for preserving a pressure gradient therein to establish flow of the compressed fluid through the outlet port; and means defining a passage in the housing having an intake disposed to receive fluid from the peripheral impeller blade cavities between the stripper means and the inlet port;

the passage having an exhaust opening communicating with the cavity portion of the chamber for imparting vortex motion to the received fluid upon entering the compressor chamber.

40. A regenerative compressor, comprising:

a stationary housing defining an annular compressor chamber comprised of adjacent communicating annular blade pass and cavity portions and having inlet and outlet ports communicating with the chamber, the housing further having an annular channel opening into the compressor at a periphery thereof;

an impeller supported in the housing for rotation about the axis of the compressor chamber and comprised of a rotor, a series of unshrouded mutually spaced blades projecting radially from the rotor periphery and occupying the blade pass portion of the chamber, and an annular ring supporting the edges of the impeller blades and occupying at least a portion of the annular channel in the housing, the annular ring including a succession of radially extending projections forming with the channel a like succession of communicating peripheral chambers rotatable with the impeller to decrease the flow of fluid in the annular channel between high and low pressure regions in the compressor chamber, the blades having edges conforming to the cross-sectional geometry of the blade pass portion of the chamber and defining between adjacent ones thereof and the blade pass chamber portion a series of peripheral cavities to induce vortex motion of a fluid in the chamber about the line of fluid transport between the inlet and outlet ports upon rotation of the impeller; and flow stripper means interrupting the cavity portion of the chamber for preserving a pressure gradient therein to establish flow of the compressed fluid through the outlet port.

41. A regenerative compressor, comprising:

a pair of stationary housings each defining a coaxial annular compressor chamber comprised of adjacent blade pass and cavity portions and each having inlet and outlet ports, ones of the inlet and outlet ports in each housing being located in a respective chamber portion;

an impeller supported in each housing for rotation about an axis of the compressor chambers and comprised of a rotor and a series of unshrouded mutually spaced blades projecting radially from the rotor periphery and occupying the blade pass portion of a respective chamber, the blades conforming generally to the cross-sectional geometry of the blade pass chamber portion and defining between adjacent ones thereof and said chamber portion a series of peripheral cavities to induce vortex motion of a fluid about the line of fluid transport in the chamber between the inlet and outlet ports;

flow stripper means interrupting the cavity portion of each chamber for preserving a pressure gradient therein resulting in flow of the compressed fluid through the outlet port; and spacer means interposed between the first and second housings and including a passage connecting the outlet port of one housing with one of the ports of the other housing, the passage forming an angle with a plane normal to the axis of impeller rotation so that the velocity of fluid flow in the passage between said outlet and inlet ports has a component in the direction of impeller rotation.

42. A compressor as set forth in claim 41, further comprising:

means for cooling the fluid in the housing compressor chambers.

References Cited

UNITED STATES PATENTS

| 1,529,815 | 3/1925 | Siemen et al. | 103—96 |
| 2,722,892 | 11/1955 | French | 103—108 |
| 2,970,234 | 1/1961 | Ericson | 310—63 |
| 3,252,421 | 5/1966 | Luhmann | 103—96 |
| 3,279,385 | 10/1966 | Suzuki | 103—97 |
| 3,356,033 | 12/1967 | Ullery | 103—96 |
| 3,375,970 | 4/1968 | Zoehfeld | 230—129 |

FOREIGN PATENTS

| 1,281,170 | 12/1961 | France. |
| 701,459 | 1/1941 | Germany. |
| 729,453 | 11/1942 | Germany. |
| 868,956 | 3/1953 | Germany. |
| 335,586 | 2/1936 | Italy. |
| 84,248 | 2/1957 | Netherlands. |
| 321,841 | 7/1957 | Switzerland. |

HENRY F. RADUAZO, Primary Examiner

U.S. Cl. X.R.

415—53, 199, 168, 177; 417—423